United States Patent [19]

Propster et al.

[11] 4,422,847

[45] Dec. 27, 1983

[54] PREHEATING GLASS BATCH

[75] Inventors: Mark A. Propster, Gahanna; Charles M. Hohman, Granville; Stephen Seng, Frazeysburg, all of Ohio

[73] Assignee: Owens-Corning Fiberglas Corporation, Toledo, Ohio

[21] Appl. No.: 335,006

[22] Filed: Dec. 28, 1981

[51] Int. Cl.³ ............... F27D 17/00; F27B 15/00; F28B 3/00

[52] U.S. Cl. .................... 432/28; 165/111; 432/215

[58] Field of Search ............ 432/27, 28, 215; 165/111

[56] References Cited

U.S. PATENT DOCUMENTS 2,592,783  4/1952  Aspegren ................ 165/111
2,872,386  2/1959  Aspegren ................ 432/215
4,207,943  6/1980  Gardner .................. 165/1
4,319,903  3/1982  Hohman ................... 65/27
4,338,113  7/1982  Hohman et al. .......... 165/111

Primary Examiner—John J. Camby
Attorney, Agent, or Firm—Ronald C. Hudgens; Patrick P. Pacella; Ted C. Gillespie

[57] ABSTRACT

A method and apparatus for preheating particulate glass batch comprises a rotatable drum for mixing the batch with particulate heat transfer media in a heat transfer relationship where the batch is separated from the media in a media exit vestibule having a screen through which the batch passes and having compartments mounted for rotation about the axis of the drum for lifting the separated batch to the batch inlet conduit where it is directed back into the drum.

9 Claims, 4 Drawing Figures

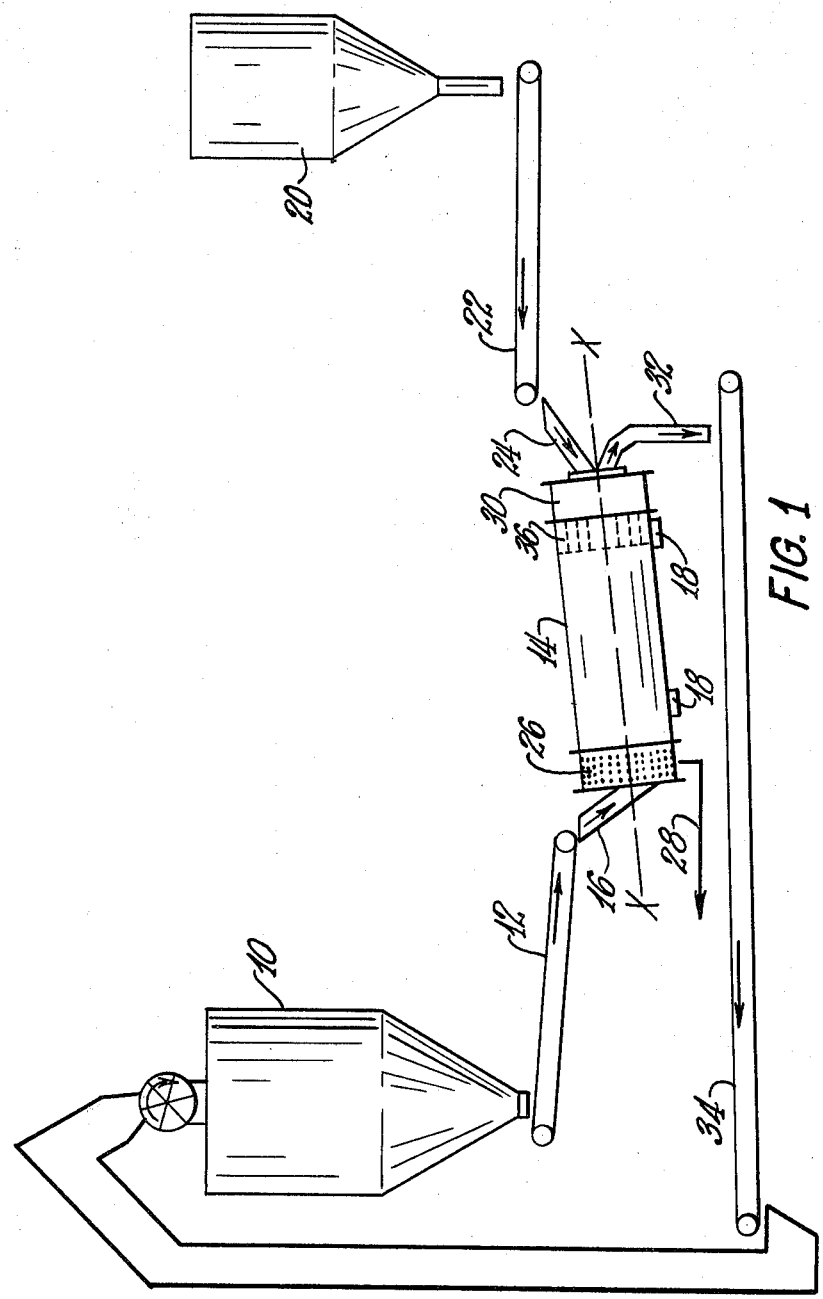

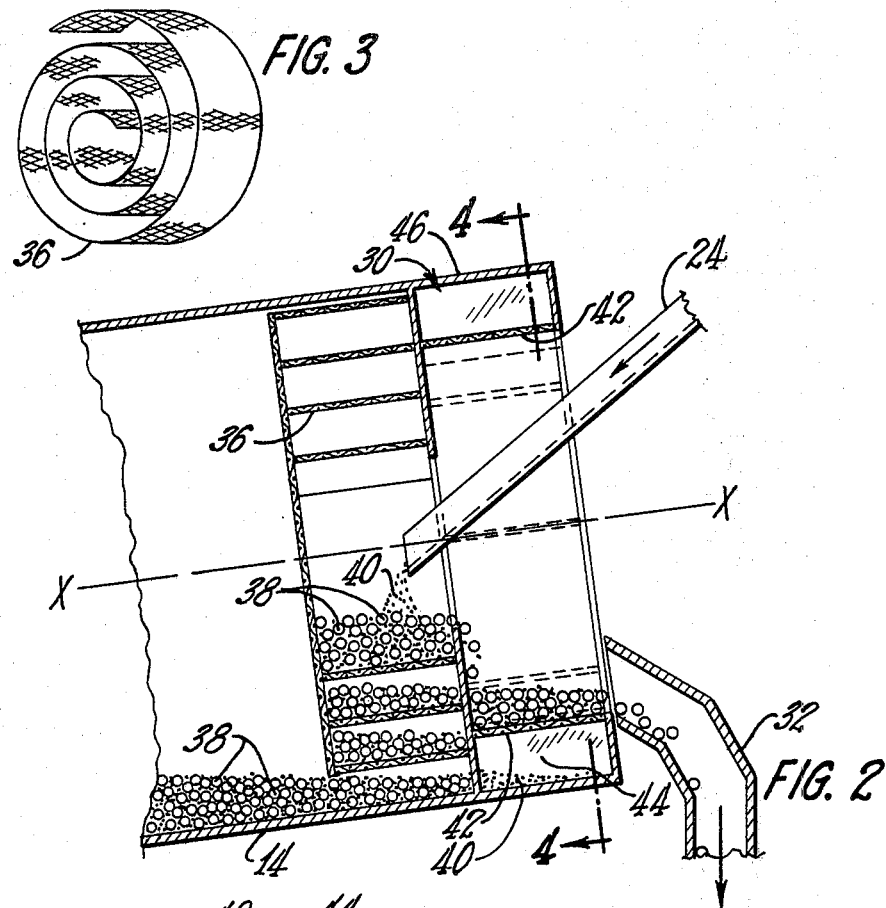
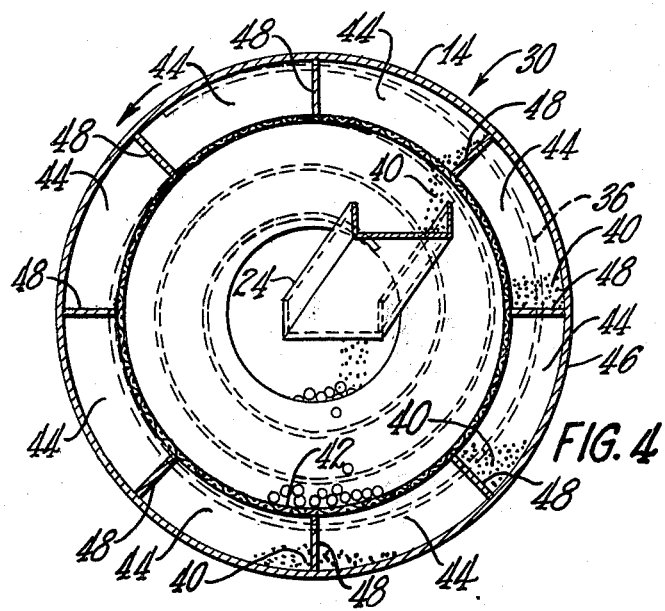

PREHEATING GLASS BATCH

TECHNICAL FIELD

This invention relates to a process for preheating glass batch which is then fed to a glass-melting furnace.

BACKGROUND OF THE INVENTION

One method for preheating glass batch involves feeding cold particulate glass batch raw materials into one end of a rotating heat-transfer drum, and feeding hot media of larger particle size than the batch particles into the other end of the heat transfer drum. The glass batch moves in direct and immediate physical contact with the heated media, with the batch flowing from the cold end to the hot end of the drum and the media flowing from the hot end to the cold end of the drum. The heated particulate batch is removed from the hot end of the drum, and the cooled media is removed from the cold end of the drum. Preferably, the heat transfer media is of a durable material and can be comprised of glass batch agglomerates, glass, ceramic material, steel, stainless steel, aluminum, or gravel. The media can be spherical in shape, and a useable example of such media is spherical ceramic balls. The media can be heated with an external burner or preferably heated by direct contact with exhaust gases from a glass melting furnace.

A problem with such a preheating apparatus and method is that the cold balls exiting the heat transfer drum carry some of the particulate glass batch with them. This is undesirable because the particulate glass batch can melt and foul the heating apparatus for reheating the balls prior to their reintroduction into the heat transfer drum. There is a need for separating particulate batch material from the heat transfer media as the heat transfer media is discharged from the heat transfer drum.

SUMMARY OF THE INVENTION

According to this invention, there is provided apparatus for preheating particulate glass batch comprising a rotatable container for mixing said batch with particulate heat transfer media in a heat transfer relationship, the heat transfer media being larger in particle size than the batch, and a media exit vestibule for separating the media from the batch comprising a generally cylindrical screen mounted for rotation about its symmetrical axis, the screen having openings sufficiently small to prevent the passage of the media therethrough and sufficiently large to enable the passage of the batch therethrough, carrier means mounted for coaxial rotation with the screen for lifting the separated batch, and means for directing the separated batch from the exit vestibule into the container.

In a specific embodiment of the invention the carrier means comprises a plurality of compartments defined by a cylindrical surface rotating coaxially with the screen and by a plurality of baffles mounted between the screen and the surface.

In a preferred embodiment of the invention the means for directing the separated batch comprises a batch inlet conduit.

According to this invention, there is also provided apparatus for preheating particulate glass batch comprising substantially spherical heat transfer balls which are larger in size than the batch particles, a cylindrical drum mounted for rotation about its symmetrical axis for mixing the batch with the balls in a heat transfer relationship, a batch inlet conduit for directing batch into the drum, and a ball exit vestibule for separating the balls from the batch comprising a cylindrical screen mounted for rotation about the axis, the screen having openings sufficiently small to prevent the passage of the balls therethrough and sufficiently large to enable the batch to pass through the screen, a plurality of compartments mounted for rotation about the axis for lifting the separated batch and for depositing the separated batch in the batch inlet conduit.

In a preferred embodiment of the invention, the separated batch falls to the bottom of the exit vestibule and the compartments are adapted to lift the separated batch to the top of the exit vestibule.

In the most preferred embodiment of the invention the balls are lifted from the bottom of the drum to the exit vestibule with a scroll.

According to this invention, there is also provided a method for preheating particulate glass batch comprising rotating a container to mix the batch with particulate heat transfer media in a heat transfer relationship, passing the media into a rotating media exit vestibule, separating the batch from the media, lifting the separated batch, and directing the separated batch from the exit vestibule into the container.

According to this invention, there is also provided a method for preheating particulate glass batch comprising rotating a cylindrical drum about its symmetrical axis to mix the batch with particulate heat transfer media in a heat transfer relationship, directing batch into the drum via a batch inlet conduit, passing the media into a media exit vestibule mounted for rotation about said axis, separating the batch in the exit vestibule from the media by passing the batch through a screen and into a plurality of compartments, and rotating the compartments about the axis to lift the separated batch and deposit the separated batch in the batch inlet conduit.

DESCRIPTION OF THE DRAWINGS

FIG. 1 is a schematic view in elevation of the invention including a rotary drum heat exchanger.

FIG. 2 is a section view of the media exit vestibule end of the heat transfer drum.

FIG. 3 shows an expanded metal scroll which can be used to lift the heat transfer media from the bottom of the drum into the exit vestibule.

FIG. 4 is section view of the exit vestibule taken along lines 4—4 of FIG. 2.

DESCRIPTION OF THE INVENTION

This invention will be described in terms of a glass particulate batch preheating operation, although it is to be understood that the term "glass" includes other heat-softenable mineral material, such as rock, slag, and basalt.

As shown in FIG. 1, the heat transfer media can be heated in preheat hopper 10 and transferred via media conveyer 12 which deposits the media into a rotatable container, such as heat exchange drum 14 via media charge conduit 16. Preferably, the media is heated by exhaust gases from a glass making furnace, although it can be heated by other means. The heat exchange drum can be mounted on bearings 18 for rotation about axis x-x, preferably inclined at a small angle to the horizontal. Particulate glass batch material 40 supplied from batch supply 20 is transported on batch conveyer 22 and discharged into the heat exchange drum by means of batch inlet conduit 24. The cold batch material travels in a direction opposite that of the hot heat transfer media and is discharged from the heat transfer drum through batch discharge screen 26 at the hot end of the heat transfer drum as hot batch stream 28. The hot batch discharge stream is supplied to the glass melting furnace. The heat transfer media travels from the hot end of the heat transfer drum to the cold end of the heat transfer drum through media exit vestibule 30 and is conveyed by media discharge conduit 32 and return media conveyer 34 for return to the preheat hopper.

As shown in FIGS. 2, 3, and 4, at the cold end of the heat transfer drum is positioned scroll 36 and the media exit vestibule. The scroll is mounted for rotation with the drum to lift media 38 from the bottom of the drum to a higher position where the media can fall into the exit vestibule. Preferably, the scroll is a helical screen with openings small enough to prevent the heat transfer media from passing therethrough, but large enough for the batch to pass therethrough.

The exit vestibule is comprised of a generally cylindrical screen, such as discharge screen 42, mounted for rotation about its symmetrical axis, and carrier means 44 mounted for coaxial rotation with the discharge screen for lifting the batch passed through the screen. The axis of rotation of the screen can be axis x-x. The screen supports the media and has openings large enough for the particulate batch to pass therethrough but small enough so that the media does not pass through. The carrier means can be any suitable means for lifting the separated batch, i.e., the particulate batch passed through the screen. Preferably the carrier means comprises compartments defined by cylindrical surface 46, which is the outside of the exit vestibule, and baffles 48 positioned between the screen and the cylindrical surface. The compartments, being part of the exit vestibule, rotate from the bottom of the exit vestibule to the top of the exit vestibule to lift the separated batch and drop it onto a means for directing the batch into the heat transfer drum. Preferably, the means for directing the batch into the heat transfer drum is the batch inlet conduit.

In operation, the hot heat transfer media, such as ceramic balls, travel to the cold end of the heat transfer drum, are lifted by the scroll, and fall into the exit vestibule. There, particulate batch is shaken from the balls and the batch passes through the discharge screen, where it is lodged in one or more of the compartments. The balls continue to fall through the exit vestibule and out into the media discharge conduit. The rotation of the compartments lifts the separated batch to a position above the batch inlet conduit where the batch falls into the batch inlet conduit and is diverted back into the heat transfer drum, or into the interior of the scroll, which is positioned in the heat transfer drum.

It will be evident from the foregoing that various modifications can be made to this invention. Such, however, are considered as being within the scope of the invention.

We claim:

1. Apparatus for preheating particulate glass batch comprising a rotatable container for mixing said batch with particulate heat transfer media in a heat transfer relationship, said heat transfer media being larger in particle size than said batch, and a media exit vestibule for separating said media from said batch comprising a generally cylindrical screen mounted for rotation about its symmetrical axis, said screen having openings sufficiently small to prevent the passage of said media therethrough and sufficiently large to enable the passage of said batch therethrough, carrier means mounted for coaxial rotation with said screen for lifting the separated batch, and means for directing the separated batch from said exit vestibule into said container.

2. The apparatus of claim 1 in which said carrier means comprises a plurality of compartments defined by a cylindrical surface rotating coaxially with said screen and by a plurality of baffles mounted between said screen and said surface.

3. The apparatus of claims 2 or 3 in which said means for directing comprises a batch inlet conduit.

4. Apparatus for preheating particulate glass batch comprising substantially spherical heat transfer balls which are larger in size than the batch particles, a cylindrical drum mounted for rotation about its symmetrical axis for mixing said batch with said balls in a heat transfer relationship, a batch inlet conduit for directing batch into said drum, and a ball exit vestibule for separating said balls from the batch comprising a cylindrical screen mounted for rotation about said axis, said screen having openings sufficiently small to prevent the passage of said balls therethrough and sufficiently large to enable said batch to pass through said screen, and a plurality of compartments mounted for rotation about said axis for lifting the separated batch and for depositing the separated batch in said batch inlet conduit.

5. The apparatus of claim 4 in which the separated batch falls to the bottom of said exit vestibule and said compartments are adapted to lift the separated batch to the top of said exit vestibule.

6. The apparatus of claim 5 in which said compartments are defined by a cylindrical surface mounted for rotation about said axis and by baffles mounted between said screen and said surface.

7. The apparatus of claim 6 comprising a scroll for lifting said balls from the bottom of said drum to said exit vestibule.

8. The method for preheating particulate glass batch comprising rotating a container to mix said batch with particulate heat transfer media in a heat transfer relationship, directing said media into a rotating media exit vestibule, separating said batch from said media, lifting the separated batch, and directing the separated batch from said exit vestibule into said container.

9. The method for preheating particulate glass batch comprising rotating a cylindrical drum about its symmetrical axis to mix said batch with particulate heat transfer media in a heat transfer relationship, directing batch into said drum via a batch inlet conduit, passing said media into a media exit vestibule mounted for rotation about said axis, separating said batch in said exit vestibule from said media by passing said batch through a screen and into a plurality of compartments, and rotating said compartments about said axis to lift the separated batch and to deposit said separated batch in said batch inlet conduit.

* * * * *